United States Patent [19]

Chen

[11] Patent Number: 5,471,506
[45] Date of Patent: Nov. 28, 1995

[54] METHOD AND APPARATUS FOR PULSE COMMUNICATION

[75] Inventor: Kejiong Chen, Bldg. 117 Meiyuan, Fujiapo, Wuchang District, Wuhan, Hubei 430070, China

[73] Assignees: Kejiong Chen; Shuzhen He; Chunhui Chen; Cuiwei Chen, all from Wuhan, China

[21] Appl. No.: 88,364

[22] Filed: Jul. 9, 1993

[30] Foreign Application Priority Data

Jul. 10, 1992 [CN] China ................................ 92105793.8

[51] Int. Cl.$^6$ ................................................ H04B 14/04
[52] U.S. Cl. ............................................. 375/242; 375/219
[58] Field of Search .................................. 375/4, 7, 8, 25, 375/36, 37; 341/108, 126, 144, 155, 150, 154; 307/260, 261; 332/106

[56] References Cited

U.S. PATENT DOCUMENTS

| | | | |
|---|---|---|---|
| 3,761,622 | 9/1973 | Stucklen | 375/37 |
| 3,962,549 | 6/1976 | Zuk | 375/4 |
| 4,302,757 | 11/1981 | Still | 375/39 |
| 5,136,264 | 8/1992 | Nardozza | 307/261 |
| 5,227,740 | 7/1993 | Steinhagen et al. | 307/261 |

*Primary Examiner*—Stephen Chin
*Assistant Examiner*—Don N. Vo
*Attorney, Agent, or Firm*—Longacre & White

[57] ABSTRACT

The present invention relates to telecommunication technology, and more particularly, to a method and apparatus for pulse communication wherein rectangular pulse is replaced by cosine pulse. According to the present invention, cosine pulse analog modulation signal or cosine pulse code modulation signal may be transmitted in communication channel. Inside the enclosure of two communication apparatus designed according to the above method, there is provided circuits for converting rectangular pulse into cosine pulse by electronic switch. The present invention has the advantages of narrow occupation bandwidth, high output power, long transmission distance, and no intersymbol interference, etc. S/N ratio and crosstalk are improved greatly. In addition, when the conventional transmitter is switched to work under cosine pulse transmission, receiver can work without any amendment and communication quality is improved too. So, the present cosine pulse communication method is compatitiable with the conventional rectangular pulse communication.

4 Claims, 6 Drawing Sheets

METHOD AND APPARATUS FOR PULSE COMMUNICATION

BACKGROUND OF THE INVENTION

The present invention relates to telecommunication technology, and more particularly, to a method and apparatus for pulse communication.

It is well known that telecommunication technology is a technology concerning the producing, processing, exchanging, recording, dubbing, transmitting, transferring, and receiving of electrical signals. Since the electrical signals are information carriers, telecommunication technology is also called "electrical signal transmission technology". Information such as character, data, voice, image, sensor signal, etc is included in all the source signals to be transmitted. Different communication systems such as telegraphs, telephones, broadcasts, faxes, televisions, radars, remote controls, romote sensing, artificial intelligence have different source signal. A communication system usually comprises an information source, a converter, a channel, a reverse convertor, and an information destination, etc., and normally can be generlized into three parts: information transmitter, information receiver and channel. Up to now, the rectangular pulse communication method has been used in pulse communication systems.

Conventional systems using rectangular pulse communication methods have the disadvantage of occupying a very wide bandwidth. Even the square pulse, which has the best spectrum characteristics of all the rectangular pulses, a bandwidth of 9 times the fundamental—frequency bandwidth is required in order to assure good communication quality. This requirement can hardly be met in actual communication system. In order to carry out communication, the basic shape of all kinds of pulse must be maintained. Therefore, they should at least consist of a fundamental frequency and its lowest harmonic (in order to facilitate description, this kind of combined wave is refered to below as fundamental low wave). From the spectrum expression of a square pulse, $$I(t) = \frac{1}{2} + \frac{2}{\pi}[\cos \omega t - \frac{1}{3} \cos 3\omega t + \frac{1}{5} \cos 5\omega t - \frac{1}{7} \cos 7\omega t + \ldots + (-1)^n/2n+1 \cos(2n+1)\omega t + \ldots]$$

it can be inferred that the bandwidth of its fundamental low wave is three times that of its fundamental frequency.

Since rectangular pulse occupy very wide bandwidth, communication system using these type of pulses also have the following disadvantages:

1. In the course of transmission, power loss is heavy, pulse deformation is severe, and the ratio of signal to noise is low. In addition, intersymbol interference is heavy, and transmission distance is short, too. The longest transmission distance (to a singal station) is only 1.7 kilometers, and the number of possible relay stations allowed is also less than 10.

2. When using a rectangular pulse, the gain of the electrical device is small, and the transmitted power is low.

SUMMARY OF THE INVENTION

The object of the present invention is to provide a method and apparatus for pulse communication, which are able to overcome the above—mentioned problems existing in the prior art and to significantly improve the communication quality.

The object of the present invention is realized by replacing the rectangular pulse communication of conventional pulse communication method with cosine pulse communication.

There are two types of cosine pulse communication methods: one is the use of the cosine pulse as a switching pulse during cosine pulse transmission, and the transmitting of the cosine pulse analog modulation signal in the channels. The other is the converting of rectangular pulses into cosine pulses before the rectangular pulse code modulation signal is sent to the channel, and the transmitting of the cosine pulse code modulation signal in the channel.

For application of the cosine pulse communication method, two different kinds of communication apparatus are suitable both having a communication circuit consisting of a transmitter and a receiver which are arranged inside one enclosure.

The first kind is a pulse analog modulation communication apparatus suitable for transmission without relay station. The communication circuit of this kind of apparatus is an analog modulation and demodulation circuit, wherein the positive and negative terminals of a cosine pulse generator diode D are coupled to the emitter of a cosine signal outputting transistor and the base of an electronic switch transistor, respectively.

The other kind is a PCM communication apparatus suitable for transmission via relay station(s), wherein its circuit is a coding demodulation circuit comprising ICs only or ICs and discrete components. The transmitter of the circuit comprising ICs only includes a coder/decoder, a positive/negative pulse separator, a pulse duration expander, a fundamental frequency extractor, a phase adjustment means, a cosine pulse forming means, an electronic switch, a positive/negative pulse combining means, etc, while the circuit comprising ICs and discrete components includes a coder/decoder, an impedance transformer, an amplifying means, a pulse duration expander, an electronic switch, a fundamental frequency extractor, a phase adjustment means, a cosine pulse generator, a positive/negative cosine pulse combining means and an output means, etc.

The receiving portion of the communication apparatus according to the present invention is the same as that of the prior art. In order to facilitate installation and save space, the transmitting and receiving circuits can be integrated on a single chip.

According to the present invention, rectangular (or square) pulse can be replaced by cosine pulses in PCM communication. The reasons are as follows:

A cosine pulse can also be called a half wave rectification pulse and its mathematical expression is as follows:

$$I(t) = \frac{1}{\pi} + \frac{1}{2} \cos \omega t + \frac{2}{\pi} \left[ \frac{1}{3\cos 2} \omega t - \frac{1}{15 \cos 4} \omega t + \frac{1}{35} \cos 6\omega t - \ldots + \frac{(-1)^{n+1}}{4n^2 - 1} \cos 2n\omega t + \ldots \right]$$

It is disclosed in the book "Principles of digital communication" (Li, Wenhai, et al, People's Telecommunication Press, Beijing, China, 1986, pp212) that the regeneration threshold voltage is half of the peak signal magnitude. Therefore, the cosine pulse falls within the judgment threshold voltage being in the range of ±60°, and judgment time is ⅔ of the duration of the cosine pulse. Since there is enough time to carry out judgment, it is possible for the cosine pulse to replace the rectangular pulse in PCM communication, and the fundamental low wave whose bandwidth is only twice that of the fundamental frequency will ensure a good communication quality. This is the lowest bandwidth theoretical extreme for pulse, and only cosine pulse has this characteristic.

Occupying a narrow frequency band is the most important advantage of the present invention (at least ⅓ of the frequency band used by a square pulse can be saved). The other advantages are as follows:

1. When the average power of a cosine pulse is equal to that of a square pulse, the average power of the fundamental low wave of the cosine pulse is higher by 30% than that of the fundamental low wave of the square pulse.

2. Loss of the lowest harmonic of the cosine pulse is only ⅒ of the loss in a square pulse when transmitted in a telephone cable.

3. There is no intersymbol interference because the rising and falling edges of a cosine pulse are quite slow and the top portion is smooth, and no overshoot, undershoot, or trailing occurs.

4. When the semiconductor devices like transistors, operational amplifiers, etc. work under cosine pulse state, the gain and average output power are increased by 1.5 times and 3 times, respectively, compared to the prior art.

5. The ratio of signal to noise is increased, and crosstalk is improved tremendously.

6. Transmission distance is increased.

7. The present cosine pulse communication method is compatible with the conventional rectangular pulse communication method. When the transmitter side is changed to work with cosine pulse transmission, no alteration is required for the receiver side to work. Furthermore, communication quality is greatly improved.

DETAILED DESCRIPTION OF THE PREFERRED EMBODIMENTS

The present invention will be described in detail referring to the following embodiments and the accompany drawings.

In the present invention, the rectangular pulse (or square pulse) in the conventional communication system is replaced by a cosine pulse. The present invention has two aspects: one is cosine pulse code modulation communication. It differs from rectangular pulse code modulation communication in that a cosine pulse code modulation signal is transmitted in a channel, and the cosine pulse can be formed from the rectangular pulse by an electronic switch before the rectangular pulse code modulation signal is sent to the channel. The other aspect is cosine pulse analog modulation communication, which differs from rectangular pulse code analog communication in that the switching pulse is changed from a rectangular pulse to a cosine pulse, and a cosine pulse analog modulation carrier signal is transmitted in the channel.

Inside the enclosure of the communication apparatus designed by using one of the above methods, there is provided a circuit for converting rectangular pulses to cosine pulses.

Figure 1:
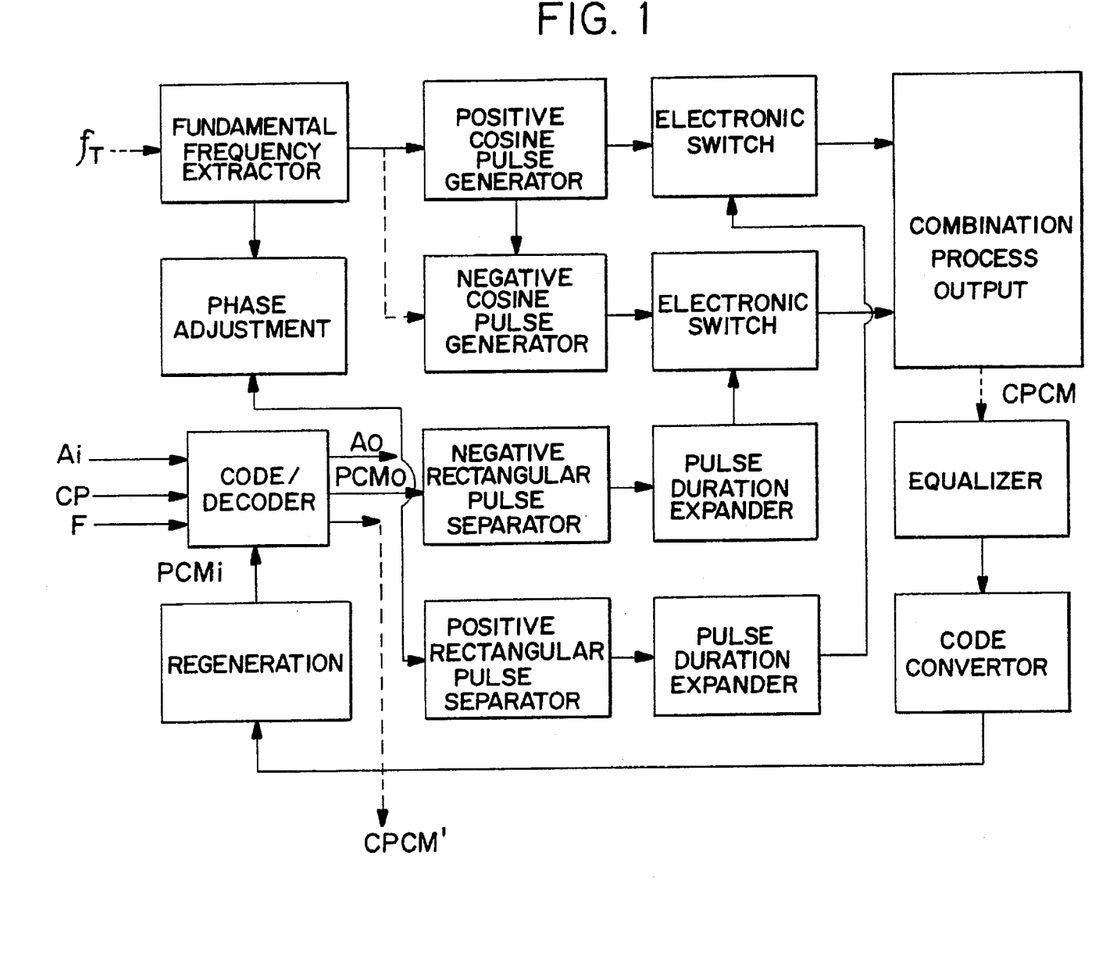
FIG. 1 is a block diagram of the cosine pulse coder/decoder transmitter/receiver circuit according to the present invention wherein the PCM' indicated by broken line is obtained by means of filtering and resonating, etc.

The communication apparatus according to the first method is a cosine PCM communication apparatus, comprising transmitter and receiver portions. The transmitter portion shown in the block diagram of FIG. 1 comprises: a fundamental frequency extractor, a phase adjustment circuit, a positive/negative cosine pulse generator, a positive/negative rectangular pulse seperator, a positive/negative cosine pulse combinor, a filter, a compensator, and an output portion. The receiver portion is a convention receiver. The description of the receiver portion is omitted here for the sake of simplification. According to the types of components used, the present apparatus may be categorized in to three types: IC type, mixed type comprising both ICs and transistors, and all transistor type.

Figure 2:
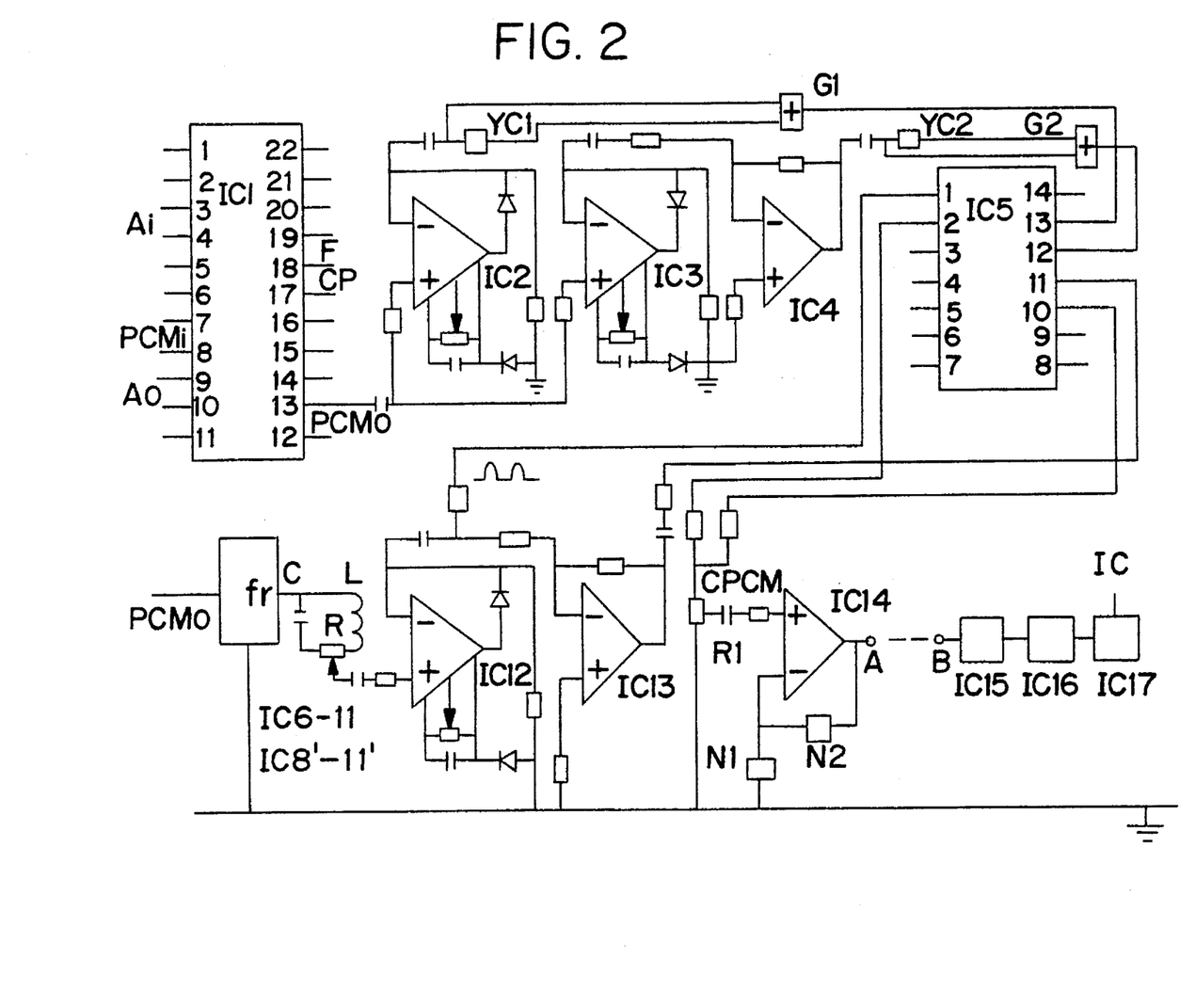
FIG. 2 is an IC type circuit diagram of the cosine PCM circuit in FIG. 1.

FIG. 2 illustrates the principle circuit diagram of the IC type cosine PCM communication apparatus. In the transmitter circuit, two rectangular pulse code modulation output signal PCMs are outputted from pin 13 of coder/decoder $IC_1$. One output signal is sent to pins 13 and 12 of the electronic switch $IC_5$, as a switching pulse signal for the $IC_5$, via positive and negative pulse separation circuits $IC_2$ and $IC_3$, wherein $IC_4$ is the inverting output circuit of $IC_3$. Positive and negative rectangular pulse duration expanders comprising delay and OR gates ($YC_1$ and $G_1$, $YC_2$ and $G_2$) are connected between $IC_2$ and $IC_5$, and $IC_4$ and $IC_5$, respectively, so as to ensure that all the cosine pulses pass $IC_5$. The other output signal PCMo is provided to $IC_6$-$IC_{11}$/$IC_{11}$ to extract the fundamental frequency (wherein $IC_6$- $IC_7$ are full-wave rectifier, $IC_8$/$IC_8$-$IC_{11}$/$IC_{11}$ are narrow band filter), and to adjust the phase by the phase adjustment circuit comprising R, L and C in the manner shown in FIG. 3. Then, $IC_{12}$ and $IC_{13}$ form positive and negative cosine pulses which are to be sent to pins 1, 11 of $IC_5$ as the switching pulse signal for $IC_5$. The positive and negative cosine pulse outputted by pin 2, 10 of $IC_5$ are combined to form a cosine pulse code modulation signal CPCM via variable resistor $R_1$, and the signal CPCM is filtered, compensated and outputted to channel A-B by $N_1$, $N_2$ of LC or RC network and integrated circuit $IC_{14}$. In the receiver circuit, $IC_{15}$, $IC_{16}$ and $IC_{17}$ are a low pass compensator, code convertor and rectangular regenerator circuit, respectively. The output of $IC_{17}$ is connected to pin 7 of $IC_1$ as the rectangular pulse code modulation input signal PCMI for demodulation.

Figure 4:
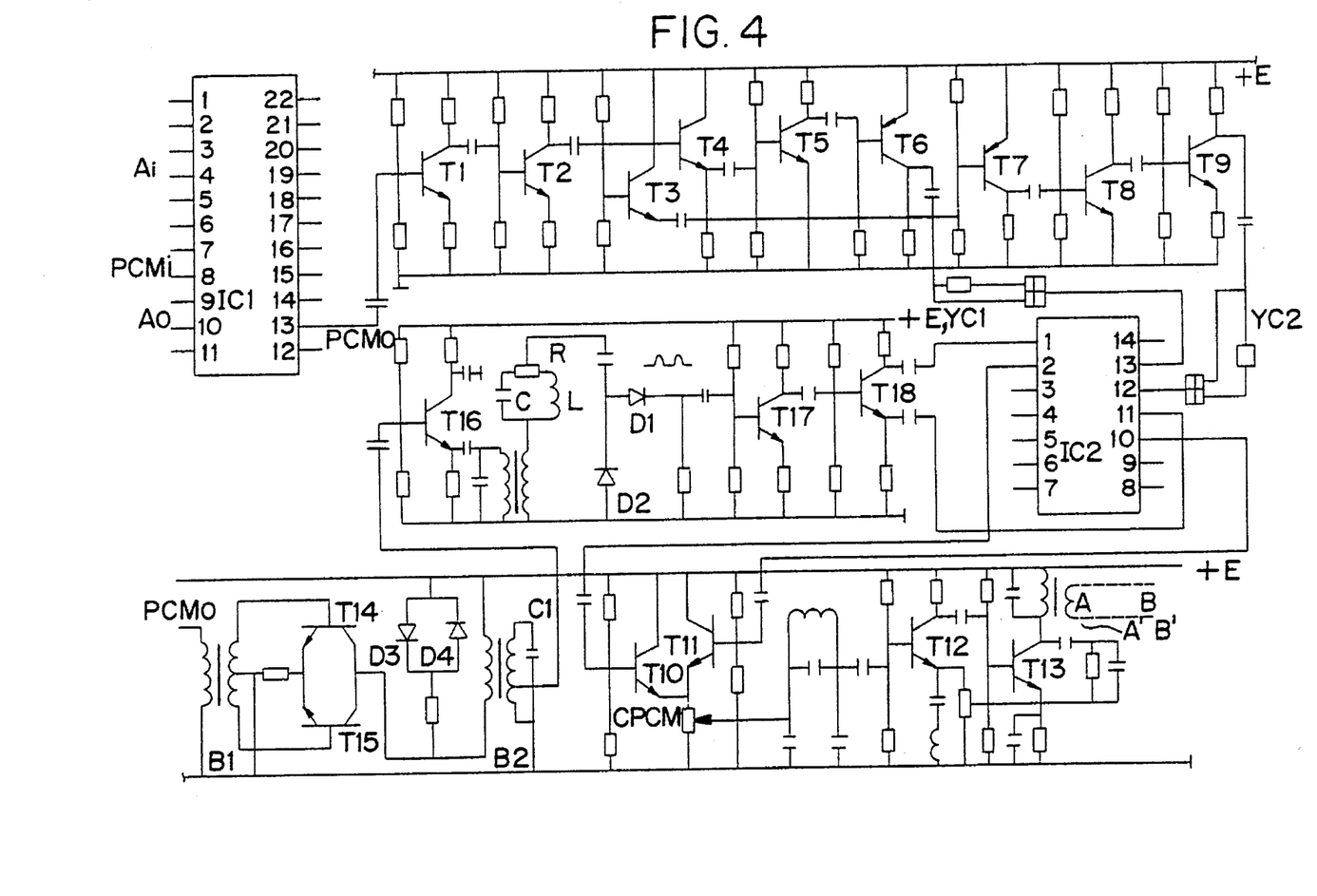
FIG. 4 is a principle diagram of the mixed type of circuit comprising transistors and ICs.

FIG. 4 illustrates the mixed type cosine PCM communication circuit. In the transmitter circuit, the rectangular pulse code modulation signal PCM outputted by pin 13 of coder/decoder $IC_1$ is sent in two directions: in one direction, the PCM signal, as the switching pulse signal for $IC_2$, is sent to pins 13, 12 of the electronic switch $IC_2$ via positive/negative pulse separator transistor $T_5$-$T_6$, $T_7$- $T_9$ after being amplified by transistors $T_1$ and $T_2$, and outputted by transistors $T_3$ and $T_4$, wherein the OR gate and delay line are employed for expanding the duration of the switching pulse. In the other direction, the PCM signal is full wave rectified by transformer $B_1$, transistors $T_{14}$ and $T_{15}$, and diodes $D_3$ and $D_4$.

Then, after the fundamental frequency is extracted by $B_2$, $C_1$, the rectified signal is outputted to RLC phase adjustment circuit after being amplified by transistor $T_{16}$. Diodes $D_1$ and $D_2$ form a cosine pulse which is sent to pins 1, 11 of $IC_2$ as a switching pulse signal for $IC_2$ after being amplified by transistor 17 and phase separated by transistor 18. Then, the positive and negative cosine pulse signals are sent to transistors $T_{10}$, $T_{11}$ from pins 2, 10 of $IC_2$, so as to form a cosine pulse code modulation (CPCM) signal on the variable resistor $R_1$. The CPCM signals, after being filtered, are sent to transistors $T_{12}$ and $T_{13}$ to be amplified, compensated, and outputted to channel A-B. At the receiver side, the received signal is equalized, code-converted, regenerated, then sent to pin 7 of $IC_1$ as a rectangular pulse code modulation input signal PCMI for demodulation.

Figure 3:
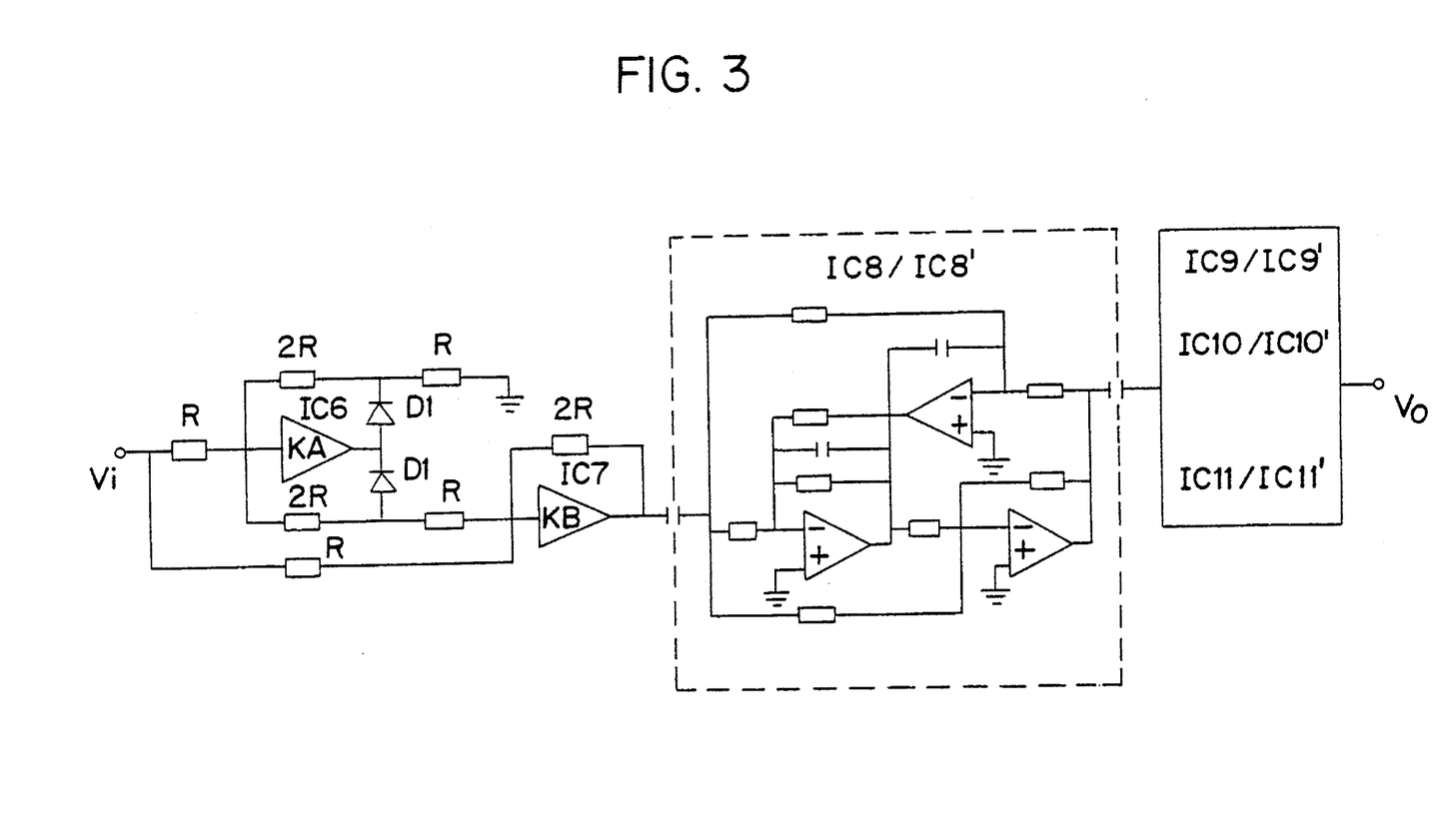
FIG. 3 is an IC style circuit diagram of the fundamental frequency extractor according to the present invention.

The circuit structure of all transistor type cosine PCM communication apparatus (not shown) is the same as that shown in FIG. 3 except that integrated circuits $IC_1$ and $IC_2$ are replaced with transistors which are equivalent in internal structure to $IC_1$ and $IC_2$.

In FIG. 2, the model of $IC_1$ may be a device in the 2911A series, $IC_5$ may be CD4066 or CC4066, and the other $IC_5$ may be LM6265 or F507. In FIG. 4, the model of $IC_1$ may be a device in the 2911A series, and $IC_2$ may be CD4066 or CC4066.

The above described embodiment is for bi-polarization code communication. If a unique polarization code is employed, some irrelevant circuit can be omitted.

Figure 5:
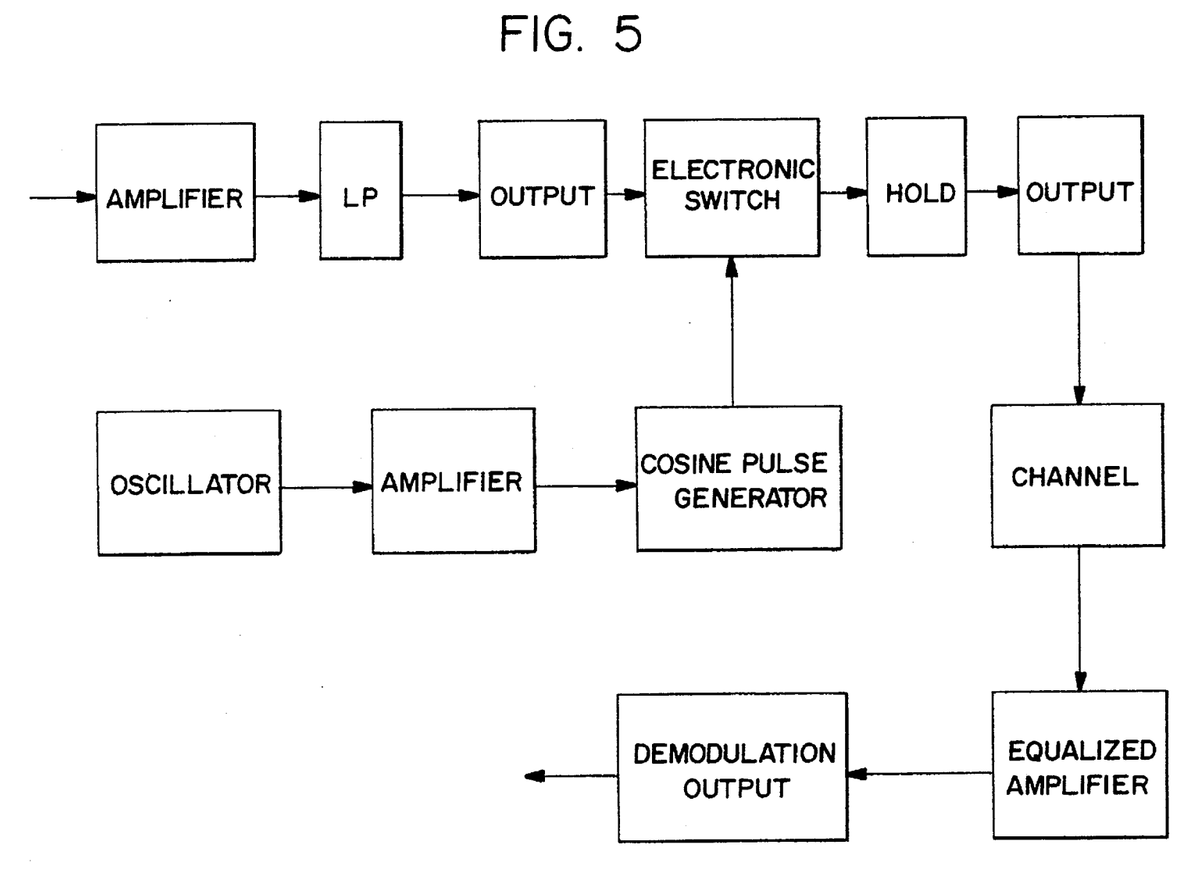
FIG. 5 is a block diagram of the cosine pulse analog modulation circuit according to the present invention.
Figures 6, 7:
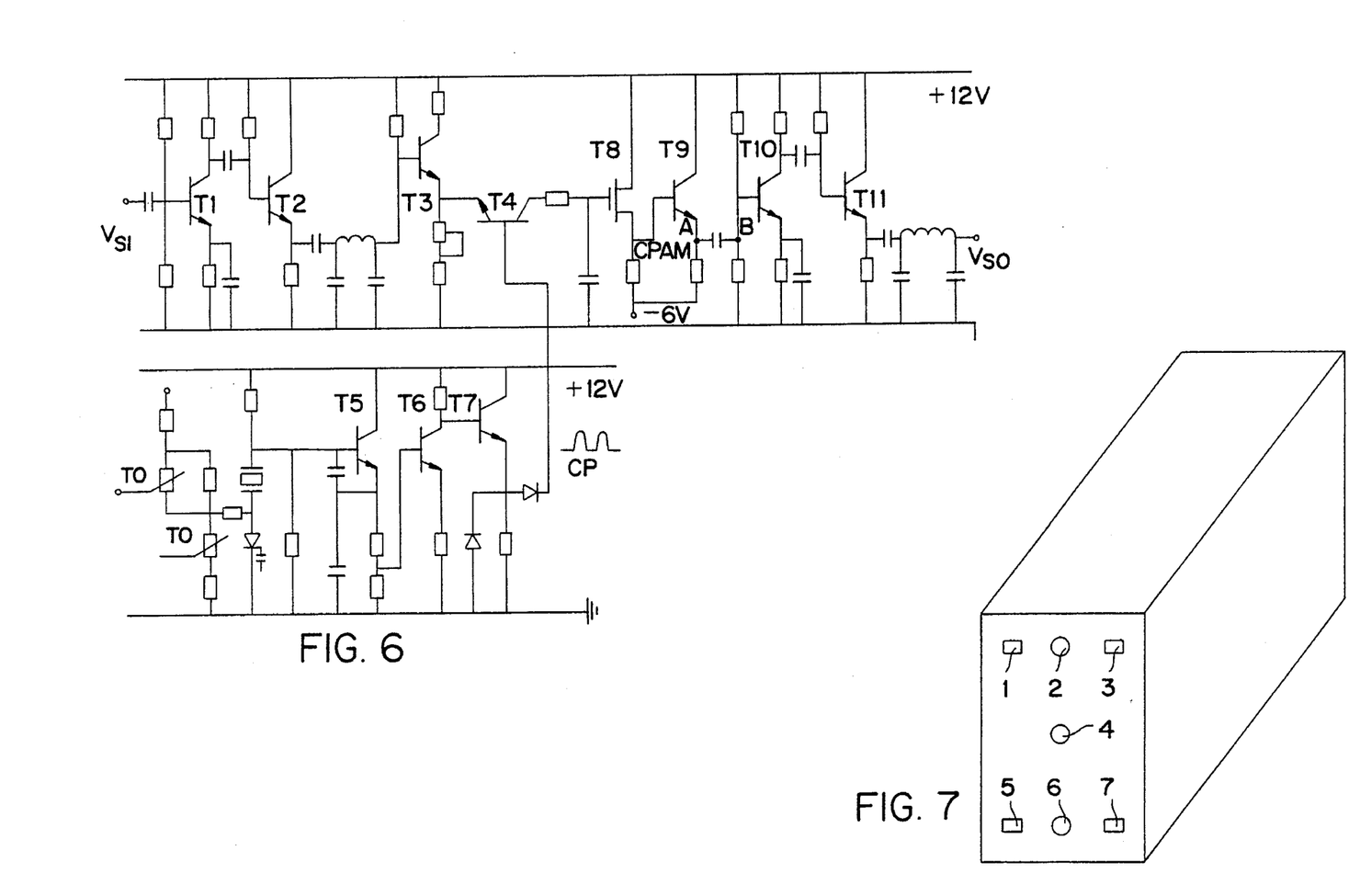
FIG. 6 is a detailed circuit diagram of the block diagram in FIG. 5.
FIG. 7 is an overview diagram of the communication apparatus according to the present invention.

The communication apparatus according to the other aspect of the present invention is a cosine pulse analog modulation communication apparatus. This communication apparatus also comprises transmitter and receiver portions. The circuit arrangement and principle structure of these two portions are essentially the same as in the prior art, the improvements made to them being shown in FIG. 5. The conventional pulse forming portion is replaced by a cosine pulse forming portion as shown in FIG. 6. The emitter of the cosine signal output transistor $T_7$ and the base of switch transistor $T_4$ are connected to the positive and negative terminals of diode D, respectively. The cosine pulse signal produced by the diode D is used as the switching pulse signal for transistor $T_4$. In channel A-B, a cosine pulse analog modulation signal CPAM is transmitted. $A_0$ is the reproduced analog signal demodulated by the receiver, and $A_i$ is the analog input signal to be transmitted.

FIG. 7 shows a overview diagram of a communication apparatus according to the present invention. Reference numbers 1, 3 designate input and output indicators; 2, 4 are phase and amplitude adjusts; 5, 7 are positive and negative power indicator; and 6 is power switch. They are installed on the panel of the enclosure.

The above is a description of the prefered embodiments of the invention, modifications and variations of which may be made without departing from the scope of the invention as defined in the accompanying claims.

I claim:

1. A communication apparatus comprising a pulse communication circuit consisting of a transmitter and receiver portions, said communication circuit being used to convert rectangular pulse communication to cosine pulse communication, wherein the pulse communication circuit is a cosine pulse code modulation circuit, and its transmitter circuit comprises: a coder/decoder ($IC_1$) for outputting first and second rectangular pulse code modulation output signal PCMs, a positive and negative rectangular pulse separator to generate a first switching pulse signal from said first rectangular pulse code modulation output signal PCM, a positive and negative pulse duration expander for expanding a duration of said first switching signal, a fundamental frequency extractor for extracting a fundamental frequency from said second rectangular pulse code modulation output signal PCM, a phase adjustor for adjusting a phase of said second rectangular pulse code modulation output signal PCM, a positive and negative cosine pulse generator for generating positive and negative cosine pulses forming a second switching signal, a positive and negative electronic switch adapted to receive said first and second switching signals, and a positive and negative cosine pulse combining processing and outputting portion adapted to receive and combine a positive and negative cosine pulse from said electronic switch to form a cosine pulse code modulation signal CPCM.

2. The communication apparatus according to claim 1, wherein the cosine pulse code modulation circuit is of an integrated circuit (IC) type, and in its transmitter circuit, said first and second rectangular pulse code modulation output signal PCMs are output from pin (13) of said coder/decoder ($IC_1$); said first output signal being sent to pins (13 and 12) of the electronic switch ($IC_5$) as said first switching pulse signal for the electronic switch ($IC_5$) via the positive and negative rectangular pulse separator ($IC_2$,$IC_3$) and an inverter ($IC_4$); wherein said inverter ($IC_4$) inverts the output of said positive and negative rectangular pulse separator ($IC_3$); said positive and negative rectangular pulse duration expander comprising a delay and OR gate ($YC_1$ and $G_1$, $YC_2$ and $G_2$) connected between said positive and negative rectangular pulse separator ($IC_2$ and $IC_4$) and said electronic switch ($IC_5$), so as to ensure that all the cosine pulses pass said electronic switch ($IC_5$); the second output signal is provided to said fundamental frequency extractor ($IC_6$–$IC_{11}$/$IC_{11}$) to extract said fundamental frequency, and to said phase adjustor to adjust phase by the phase adjustor comprising of R,L and C; said positive and negative cosine pulse generator ($IC_{12}$ and $IC_{13}$) form positive and negative cosine pulses which are sent to pins (1,11) of said electronic switch ($IC_5$) as said second switching pulse signal the positive and negative cosine pulse outputted by the electronic switch are combined to form said cosine pulse code modulation signal CPCM via variable resistor $R_1$, and the signal CPCM is filtered, compensated and outputted to channel A-B by an LC or RC network and an integrated circuit ($IC_{14}$); a receiver circuit comprising a low pass compensator, code converter and rectangular regenerator circuits; an output of said receiver circuit ($IC_{17}$) is connected to said coder/decoder as a rectangular pulse code modulation input signal PCMI for demodulation.

3. The communication apparatus according to claim 1, wherein the cosine pulse code modulation circuit is a mixed type cosine PCM circuit comprising transistors and integrated circuits; in the transmitter circuit, the first rectangular pulse code modulation signal PCM outputted by a coder/decoder ($IC_1$) is sent in two directions: in one direction, a first PCM signal, as switching pulse signal for said rectangular pulse separator ($IC_2$), is sent to the electronic switch ($IC_2$) via positive/negative pulse separator transistors ($T_5$–$T_6$, $T_7$–$T_9$) after being amplified by first transistors ($T_1$ and $T_2$), and outputted by second transistors ($T_3$ and $T_4$), wherein an OR gate and delay line are employed for expanding a duration of the switching pulse; in the other direction, a second PCM signal is a full wave rectified by a transformer ($B_1$), transistors ($T_{14}$, $T_{15}$) and diodes ($D_3$, $D_4$); after said fundamental frequency is extracted by said fundamental frequency extractor ($B_2$, $C_1$), a rectified signal is outputted to said phase adjustor after being amplified by a first amplifying transistor ($T_{16}$); wherein diodes ($D_1$ and $D_2$) form a cosine pulse which is sent to said rectangular pulse separator ($IC_2$) as said first switching pulse signal after being amplified by a second amplifying transistor $T_{17}$ and phase separated by separator transistor $T_{18}$; the positive and negative cosine pulse is sent to combining transistors ($T_{10}$, $T_{11}$) from said rectangular pulse separator ($IC_2$), so as to form said cosine pulse code modulation signal CPCM on a variable resistor ($R_1$); the code modulation signal CPCM, after being filtered, are sent to transistors ($T_{12}$ and $T_{13}$) to be amplified, compensated and outputted to channel A-B.

4. The communication apparatus according to claim 2, wherein said fundamental frequency extractor comprises a full-wave rectifier, and narrow band filters.

* * * * *